United States Patent
Tsotsis et al.

(10) Patent No.: US 8,361,262 B2
(45) Date of Patent: Jan. 29, 2013

(54) METHOD AND APPARATUS FOR LOW-BULK TOUGHENED FABRICS FOR LOW-PRESSURE MOLDING PROCESSES

(75) Inventors: Thomas Karl Tsotsis, Orange, CA (US); Patrick J. Thrash, Corona, CA (US); Branko Sarh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 828 days.

(21) Appl. No.: 11/937,010

(22) Filed: Nov. 8, 2007

(65) Prior Publication Data

US 2009/0120562 A1 May 14, 2009

(51) Int. Cl.
*B29C 65/20* (2006.01)
*B29C 70/36* (2006.01)

(52) U.S. Cl. ...... 156/179; 156/181; 156/182; 156/308.2

(58) Field of Classification Search .................. 156/178, 156/179, 181, 182, 308.2
See application file for complete search history.

(56) References Cited

U.S. PATENT DOCUMENTS

| | | | |
|---|---|---|---|
| 3,810,805 A | 5/1974 | Goldsworthy et al. | |
| 5,809,805 A | 9/1998 | Palmer et al. | |
| 6,040,397 A * | 3/2000 | Hooper et al. | 525/526 |
| 6,585,842 B1 | 7/2003 | Bompard et al. | |
| 7,235,149 B2 | 6/2007 | Taggart | |
| 7,435,693 B2 | 10/2008 | Tsotsis et al. | |
| 7,563,091 B2 | 7/2009 | Manuel | |
| 8,246,882 B2 | 8/2012 | Tsotsis | |
| 2002/0192467 A1* | 12/2002 | Secrist et al. | 428/365 |
| 2004/0219855 A1 | 11/2004 | Tsotsis | |
| 2005/0059309 A1 | 3/2005 | Tsotsis | |
| 2005/0236093 A1 | 10/2005 | Taggart | |
| 2005/0257887 A1 | 11/2005 | Tsotsis | |
| 2006/0065352 A1* | 3/2006 | Keuchel | 156/155 |
| 2006/0154545 A1 | 7/2006 | Tsotsis et al. | |
| 2006/0162143 A1 | 7/2006 | Nelson et al. | |
| 2008/0289743 A1 | 11/2008 | Tsotsis | |
| 2010/0003881 A1 | 1/2010 | Tsotsis | |

FOREIGN PATENT DOCUMENTS

| | | |
|---|---|---|
| EP | 1125728 A1 | 8/2001 |
| EP | 1473132 A | 11/2004 |
| EP | 2058101 A1 | 5/2009 |

(Continued)

OTHER PUBLICATIONS

EP Examination Report for application 08253598.0 dated Mar. 4, 2011.

(Continued)

*Primary Examiner* — Michael Tolin
(74) *Attorney, Agent, or Firm* — Yee & Associates, P.C.

(57) ABSTRACT

A method and apparatus for manufacturing. A fiber layer and a porous bonding layer are formed to form a unidirectional lay-up of fibers. The lay-up of fibers is heated under pressure to form a unidirectional composite tape of desired thickness to substantially maintain the fibers in a desired configuration. The unidirectional composite tape is slit to a desired width, and the slit unidirectional composite tape is loaded into a multiaxial fabric machine. A first layer is built from the composite tape in the multiaxial machine, and a second layer is built from the composite tape on the first layer at a predetermined angle from the first layer in the multiaxial machine. The first and second layers are consolidated to form a composite fabric in a continuous process.

21 Claims, 4 Drawing Sheets

FOREIGN PATENT DOCUMENTS

| | | |
|---|---|---|
| FR | 2761380 A1 | 10/1998 |
| WO | 9921697 A1 | 5/1999 |
| WO | 2007015706 A1 | 2/2007 |

OTHER PUBLICATIONS

USPTO non-final office action dated Feb. 8, 2012 regarding U.S. Appl. No. 12/558,461, 16 Pages.

USPTO restriction requirement dated Nov. 15, 2011 regarding U.S. Appl. No. 12/558,461, 7 Pages.

Response to restriction requirement dated Dec. 15, 2011 regarding U.S. Appl. No. 12/558,461, 5 Pages.

Tsotsis "Interlayer Toughening of Composite Materials," Polymer Composites, vol. 30, Issue 1, Jan. 2009, pp. 70-86.

Related U.S. Appl. No. 12/558,461, filed Sep. 11, 2009, inventor Tsotsis, 46 Pages.

EP Search Report dated Feb. 2, 2009 regarding Application No. EP08253598, 3 pages.

Response to Office Action dated May 7, 2012 regarding U.S. Appl. No. 12/558,461, 19 pages.

Notice of Allowance dated Jun. 8, 2012 regarding U.S. Appl. No. 12/558,461, 14 pages.

Tsotsis, "Method and Apparatus for Low-Bulk Toughened Fabrics for Low-Pressure Molding Processes, " U.S. Appl. No. 13/646,890, filed Oct. 8, 2012, 46 pages.

Notice of Allowance, dated Oct. 9, 2012, regarding U.S. Appl. No. 12/558,461, 9 pages.

* cited by examiner

METHOD AND APPARATUS FOR LOW-BULK TOUGHENED FABRICS FOR LOW-PRESSURE MOLDING PROCESSES

BACKGROUND INFORMATION

1. Field

The present disclosure relates generally to non-crimped fabrics and in particular to a method and apparatus for manufacturing low-bulk, non-crimped fabrics. Still more particularly, the present disclosure relates to a method and apparatus for creating composite materials from low-bulk, non-crimped fabrics.

2. Background

Aircraft are being designed and manufactured with greater and greater percentages of composite materials. Some aircraft may have more than fifty percent of their primary structure made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, lightweight materials, created by combining two or more dissimilar components. For example, a composite may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing or stabilizer sections joined to form a stabilizer.

These composite components for aircraft may include composite materials, such as, for example, without limitation, composite fabrics. The different components for an aircraft that may be created using composite materials include, for example, without limitation, a section of a fuselage, a wing panel, a wing rib, a spar, an aileron, a stabilizer, and other suitable components.

Currently used composite fabrics may be processed using a combination of heat, pressure, and vacuum in a tool, such as an autoclave. The particular part may be placed inside a bag in the autoclave. A vacuum may be applied to the bag to remove the air and volatile products. Heat and pressure may then be applied for curing. This type of process normally works well except in some cases, a particular part may be too large for an autoclave or may require an expensive autoclave that is large enough to fit the part.

An alternative type of processing for composite components may be performed using manufacturing processes that do not require the use of an autoclave, such as those that use an oven. These types of processes may also be referred to as low-pressure molding processes.

Currently used processes for creating composite fabrics include, for example, using knitting machines that pull tows across an area and clamp those tows down at different orientations to make the desired fabric (e.g. U.S. Pat. No. 5,809,805). Tows are bundles of continuous fibers that are generally stored on spools and which are typically used to create the composite fabrics. An alternative to pulling tows across an area and clamping them down to produce fabrics may be to use pre-consolidated fabrics in which pick-and-place methods (e.g. U.S. Pat. No. 6,585,842) are employed to create these layers for the fabrics before they are knitted together.

These types of processes, however, may not have the desired quality, low bulk, or fiber spreading when producing composite components with low-pressure molding processes when an interlayer material is introduced between the plies. Accordingly, there is a need for a method and apparatus for minimizing inconsistencies in fabrics that overcomes the problems discussed above.

SUMMARY

The different advantageous embodiments provide a method and apparatus for manufacturing. In one embodiment, a method is used for manufacturing. A fiber layer and a porous bonding layer may be formed to form a unidirectional lay-up of fibers. The lay-up of fibers may be heated under pressure to form a unidirectional composite tape to substantially maintain the fibers in a desired configuration. A first layer may be built from the composite tape. A second layer may be built from the composite tape on the first layer at a predetermined angle from the first layer. The first and second layers may be consolidated to form a composite fabric.

In another advantageous embodiment, an apparatus comprises a conveyor bed, a tape source, and a set of tape-lay-down units. The tape source has tape comprising a first layer of a composite tape having a layer of fiber spread out to a selected thickness and a layer of porous bonding material melt bonded onto the layer of fiber. The set of tape-lay-down units is capable of laying down a set of tape from the tape source on the conveyor bed at a set if angles to form a set of layers of tape for a composite fabric.

In a different advantageous embodiment, a method for manufacturing is provided. A fiber layer, a first porous bonding layer, and a second porous bonding layer may be formed in which the fiber layer may be located between the first porous bonding layer and the second porous bonding layer to form a unidirectional lay-up of fibers. The unidirectional lay-up of fibers may be heated under pressure to melt-bond the first porous bonding layer and the second porous bonding layer to the fiber layer to fix a position of the fibers to form a unidirectional composite tape of desired thickness tape in which fibers in the unidirectional composite tape may be substantially maintained in a desired configuration. The unidirectional composite tape may be slit to a desired width to form slit unidirectional composite tape. The slit unidirectional composite tape may be loaded into a multiaxial fabric machine. A first layer may be built from the composite tape in the multiaxial machine. A second layer may be built from the composite tape on the first layer at a predetermined angle from the first layer in the multiaxial machine. The first and second layers are consolidated to form a continuous composite fabric in a continuous process. Portions of the continuous composite fabric are laid up on a tool in a form of a composite component. Resin is introduced into the composite fabric. The continuous composite fabric on the tool in the form of a composite component is cured to form the composite component.

In another advantageous embodiment, an apparatus comprises a conveyor bed, a set of tape spools, a set of tape-lay-down units, and a stitching head. The set of tape spools have tape comprising a first layer of a composite tape having a layer of fiber spread out to a selected thickness and a layer of porous bonding material melt bonded onto the layer of fiber. The set of tape-lay-down units is capable of laying down a set of tape from the tape source on the conveyor bed at a set if angles to form a set of layers of tape for a composite fabric, wherein each tape-lay-down unit in the set of tape-lay-down units comprises a tape head capable of laying tape from a tape spool in the set of tape spools onto the conveyor bed and a moveable arm capable positioning the tape head over the conveyor bed while the conveyor bed is moving. The stitching head is capable of connecting different layers within the composite fabric formed by the set of tape-lay-down units.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
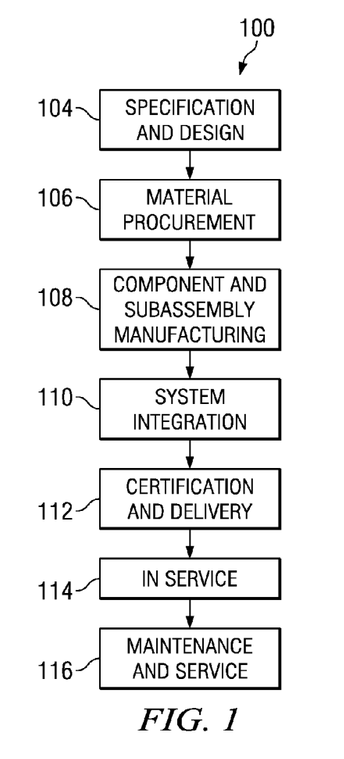
FIG. 1 is a flow diagram of aircraft production and service methodology in which an advantageous embodiment may be implemented.
Figure 2:
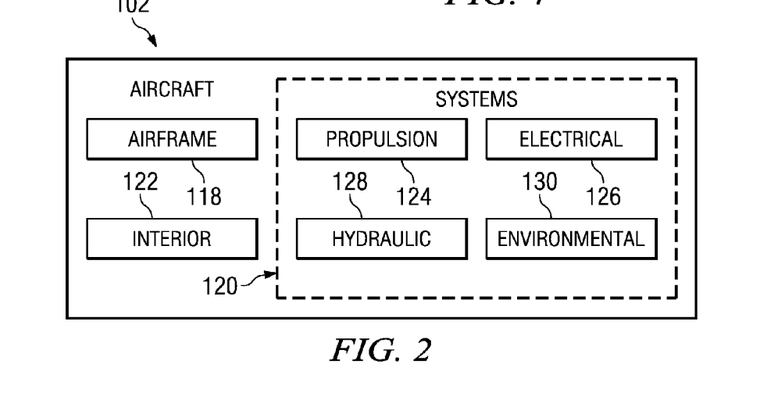
FIG. 2 is a block diagram of an aircraft in accordance with an advantageous embodiment.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

The different advantageous embodiments may be applied to manufacturing or forming composite components. More specifically, the different advantageous embodiments may be applied to processes in which composite components may be formed through low-pressure curing processes. A low-pressure process, in these advantageous embodiments, may be a process in which normal atmosphere pressure may be present in curing a composite component. This type of process may be in contrast to curing composite components using autoclaves which additional pressure may be added.

The different advantageous embodiments recognize that the currently used processes for creating fabrics may not have the desired quality, low bulk, or fiber spreading when producing composite components with low-pressure molding processes when an interlayer material is introduced between the plies. Accordingly, based on the problem recognized by the different advantageous embodiments, a need is present for a method and apparatus for minimizing inconsistencies in fabrics that overcome the problems discussed above.

The different advantageous embodiments recognize that current fabrics and method for manufacturing fabrics containing interlayer materials between layers or plies of different fiber orientation may lead to undesired dislocations of layers with low-pressure molding processes. These dislocations may cause undesirable gaps and overlaps. Interlayer materials may include, but are not limited to spunbonded, spunlaced, or staple-based nonwovens, in addition to woven materials. For example, without limitation, the different advantageous embodiments recognize that the fabrics with interlayer materials currently used may have too much bulk and/or thickness to make composite components that meet design specifications. For example, without limitation, the presence of undesired gaps between tows may contain resin-rich areas after part infusion and cure. These types of inconsistencies may be undesirable in creating composite parts. These types of issues also may be present in prepreg build-ups.

Further, the different advantageous embodiments also recognize that this bulk may result in lower fiber-volume fractions, and excess weight in the composite component. These low-pressure molding processes may not provide pressure needed to sufficiently compress fibers in the composite fabrics to a desired finished-part thickness.

Thus, the different advantageous embodiments provide a method and apparatus for manufacturing, in which a fiber layer and a bonding layer may be used to form a layup of fibers. The bonding layer is a porous bonding layer. The layup of fibers is heated along with the porous bonding layer under pressure to form a stabilized composite tape with few or controlled gaps between adjacent fiber tows. A first layer is built from the composite tape and the second layer is built from the composite tape on the first layer at a predetermined angle from the first layer to form a composite fabric. In the illustrative embodiments, a second bonding layer may be present such that the fiber layer may be located between the two bonding layers in forming the composite tape such that the two bonding layers are fully melt-bonded to the fiber, thereby reducing their bulk and fixing the spreading and spacing of the fibers.

The portions of the composite fabric may be laid-up on a tool in a form of a composite component. The composite fabric may be cured on the tool to form the composite component in these examples.

Figure 3:
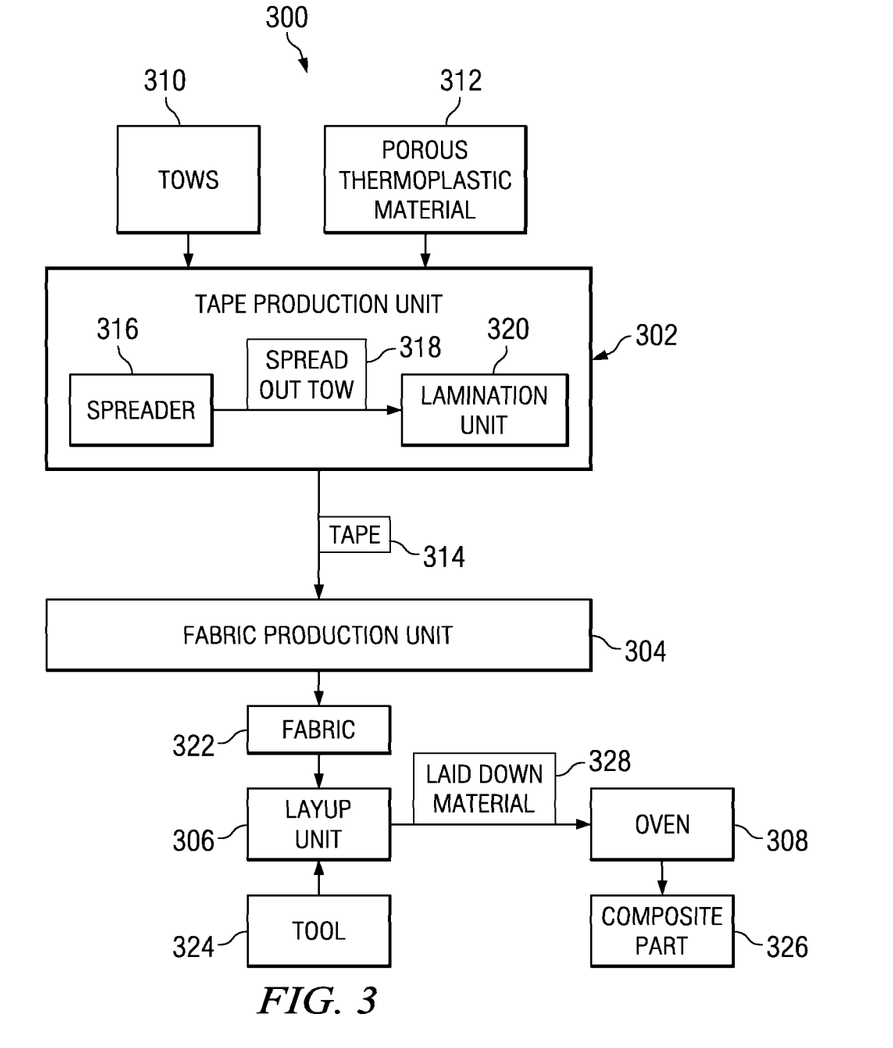
FIG. 3 is an illustration of a manufacturing system in accordance with an advantageous embodiment.

With reference now to FIG. 3, an illustration of manufacturing system 300 is depicted in accordance with an advantageous embodiment. In this illustrative example, manufacturing system 300 may include tape-production unit 302, fabric-production unit 304, layup unit 306, and oven 308.

Tape-production unit 302 may use tows 310 and porous thermoplastic material 312 to generate tape 314. A tow is typically an untwisted bundle of continuous filaments or fibers. Tows may be designated by the number of fibers that they contain. For example, a 12K tow contains around twelve thousand fibers. A tow may be located on spools. Different spools in tows 310 may contain a different number of filaments or fibers. Tape production unit 302 may pull a tow from tows 310 and pull the bundle through spreader 316. Spreader 316 may "spread" fibers within a bundle from tows 310 to a desired width to form spread-out tow 318. The desired width may be, for example, without limitation, three to four inches, or some other suitable width. Spread-out tow 318 may then be processed using lamination unit 320.

Lamination unit 320 may place a layer of porous thermoplastic material 312 on each side of spread-out tow 318 to form bonding layers. Lamination unit 320 may then apply heat and pressure to porous thermoplastic material 312 and spread-out tow 318. The application of heat and pressure generally compacts or reduces the thickness of spread-out tow 318 to a desired thickness. This type of process may also be referred to as melt-bonding. Porous thermoplastic material 312 is a melt-bondable thermoplastic material.

In other words, the layer on each side spread-out tow 318 may be melted, bonded, or attached to the fibers in spread-out tow 318 in a manner that the fibers in spread-out tow 318 may not move with respect to each other. The melt-bonding or attachment of fibers in the tows in tape 314 stabilizes it to maintain a desired thickness and consistency. As a result, the fibers may not expand to a thickness that is greater than a desired thickness at a later time when fabric 322 may be made from tape 314 by fabric-production unit 304. In other words, the melt-bonding may be performed using lamination unit 320 to minimize or eliminate undesired bulk in tape 314.

Thus, tape 314 may have fully melted, bonded porous thermoplastic materials. However, the melt-bonding should preferably be performed to minimize or eliminate smearing or calendaring of the bonding layer such that the filamentary geometry of the bonding-layer fabric remains intact. The filaments in porous thermoplastic material 312 may be melted on top, but generally should not be melted into the bundles themselves.

Tape-production unit 302 may be implemented using any commercially available tape-production unit with modifications to perform melt-bonding of porous thermoplastic material 312 to spread-out tows 318 to generate tape 314 with the desired characteristics. In these examples, tape-production unit 302 may be implemented using a conventional tape-production system adapted to produce tape 314. For example, a conventional laminating machine with a horizontal oven may be adapted for use as tape-production unit 302.

Fabric-production unit 304 may then produce fabric 322 from tape 314. Fabric-production unit 304 may be implemented using any standard fabrication production unit. A non-limiting example is a knitting machine. A knitting machine may be modified to use tape 314 instead of tows 310, which is normally used to create a fabric.

Instead, fabric-production unit 304 may use rolls of tape 314 to lay down material for fabric 322. Tape 314 may be laid-down by fabric-production unit 304, in different angles with respect to each other, to generate fabric 322. Fabric-production unit 304 pulls tape 314 onto a surface and cuts tape 314 into appropriate sizes, generally the width of the moving bed of the warp-knitting machine being used to produce the fabric. Additional strips of tape 314 may be pulled onto the surface and placed onto multiple orientations and knitted together to form fabric 322. In this manner, the different advantageous embodiments use tape 314 to create fabric 322, rather than creating fabric 322 directly from tows 310.

Thereafter, fabric 322 may be used by layup unit 306 with tool 324 to create composite part 326. Tool 324 may be, for example, without limitation, a mold on which portions of fabric 322 may be laid up into a form for composite part 326. Fabric 322 may be laid down on to tool 324 by layup unit 306 for composite part 326. After fabric 322 has been laid down onto tool 324 to form laid-down material 328, laid-down material 328 on tool 324 may be placed into oven 308 for curing.

In these examples, oven 308 may be a low-pressure oven, in which addition pressure is typically unnecessary to create composite part 326. With this type of curing, concerns with respect to the thickness of fabric 322 may not be a concern because of the stabilized material in tape 314 used to create fabric 322. In contrast, with currently available fabrics and processes to create fabrics that include interlayer materials between plies, the bulk or thickness of layers within the fabric may not meet designs or specifications when low-pressure curing processes are used. As a result, pressurized curing processes provided through autoclaves may be avoided in producing fabrics with desired bulk and/or thicknesses.

Figure 4:
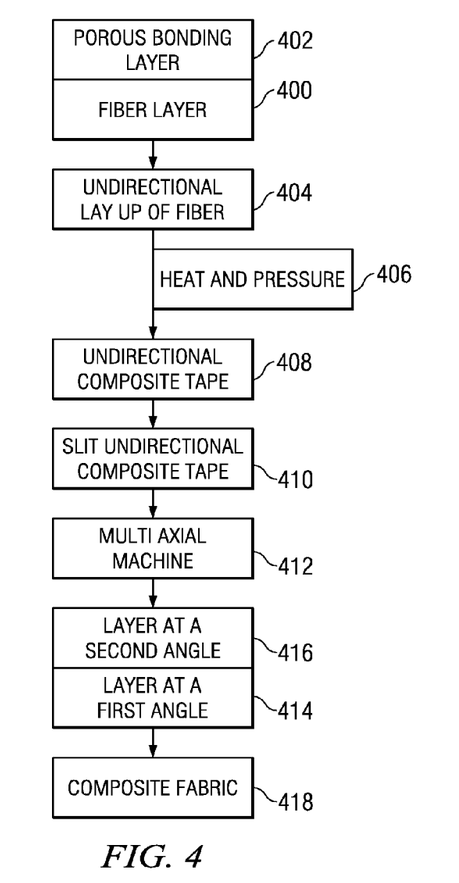
FIG. 4 is an illustration of a block diagram for manufacturing a composite fabric in accordance with an advantageous embodiment.

With Reference now to FIG. 4, an illustration of a block diagram for manufacturing a composite fabric is depicted in accordance with an advantageous embodiment. In this example, the process forms fiber layer 400 and porous bonding layer 402 to form unidirectional lay up of fibers 404. In this illustrative embodiment, heat and pressure 406 is applied to unidirectional lay up of fibers 404 to form unidirectional composite tape 408. Unidirectional composite tape 408 is slit to a desired width to form slit unidirectional composite tape 410. Slit unidirectional composite tape 410 is then loaded into multiaxial machine 412. Multiaxial machine 412 builds layer 414 at a first angle and then builds layer 416 at a second angle on layer 414 at a first angle. These two layers form composite fabric 416. Although only two layers are shown in this example, additional layers, such as, for example, without limitation, five, seven, and ten may be used, depending on the particular implementation. In these examples, production of composite fabric 416 are performed or consolidated in a continuous process.

Figure 5:
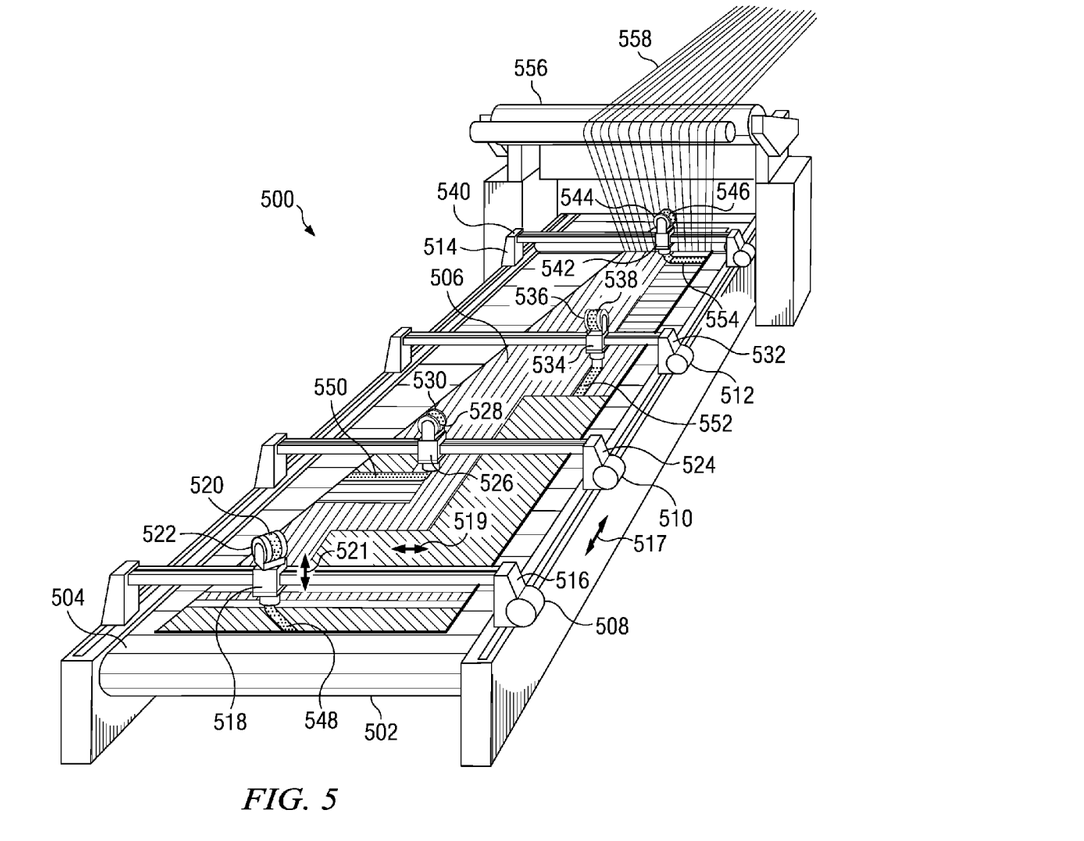
FIG. 5 is an illustration of a fabric production unit in accordance with an advantageous embodiment.

With reference now to FIG. 5, an illustration of fabric-production unit 500 is depicted in accordance with an advantageous embodiment. In this illustrative embodiment, fabric-production unit 500 is an example of fabric-production unit 304 in FIG. 3. In these examples, fabric-production unit 500 is a multiaxial machine, in these examples. A multiaxial machine is a machine that is capable of laying down materials in different orientations to manufacture a fabric.

Fabric-production unit 500 includes conveyor bed 502, which provides surface 504 for forming fabric 506. Fabric-production unit 500 also includes a set of tape-lay-down units, tape-lay-down units 508, 510, 512, and 514. The phrase "a set" used herein refers to one or more items. For example, a set of tape-lay-down units is one or more tape-lay-down units. As another example, a set of tape spools is one or more tape spools.

In these examples, tape-lay-down units 508, 510, 512 and 514 may lay down tape for fabric 506 in different orientations. These different units may lay down tape for different layers or plies of fabric 506. Tape-lay-down unit 508 includes moveable arm 516, which may move along an X-axis as shown by line 517, in this example. Tape head 518 may move along a Y-axis along moveable arm 516 as shown by line 519. Further, tape head 518 may be moveable up and down as shown by line 521 and may be rotatable around a Z-axis or around line 521. This rotation of tape head 518 may occur to change the orientation at which tape 520 on spool 522 may be laid down on conveyor bed 502 to form fabric 506. A spool that holds tape may also be referred to as a tape spool. Tape-lay-down unit 510 also includes moveable arm 524, tape head 526, and spool 528 with tape 530. In a similar fashion, tape-lay-down unit 512 includes moveable arm 532, tape head 534, and spool 536 with tape 538. Tape lay down unit 514 includes moveable arm 540, tape head 542, and spool 544 with tape 546.

Further, each of these tape-lay-down units may change the orientation at which tape may be laid down within the same layer as well as in different layers. In this example, tape-lay-down unit 508 may create layer 548 while tape-lay-down unit 510 creates layer 550. Tape-lay-down unit 512 may create layer 552, while tape-lay-down unit 514 creates layer 554, in these examples.

In addition, fabric production unit 500 also may include stitching head 556, which may connect the different layers to each other using threads 558 to consolidate the layers to form the fabric. In these examples, threads 558 may be used to generate low-density stitching to hold the different layers of fabric 506 to each other. In other illustrative embodiments, the different layers within fabric 506 may be connected to each other through other mechanisms, such as, for example, without limitation, tacking with or without heat.

In these examples, fabric-production unit 500 includes four tape-lay-down units. Of course, in other advantageous embodiments, other numbers of tape-lay-down units may be used. For example, three, six, eight, or some other suitable number of tape-lay-down units may be employed, depending on the particular implementation. Fabric-production unit 500 may be implemented using any conventional tools with modifications. For example, without limitation, fabric-production unit 500 may be implemented using a Copcentra MAX 5 CNC from LIBA Maschinenfabrik GmbH modified to use unidirectional tape instead of spread tows obtained from creels of individual tows.

Figure 6:
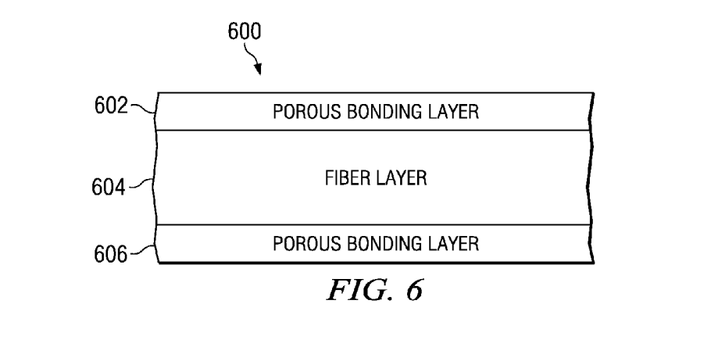
FIG. 6 is an illustration of a cross-sectional view of tape in accordance with an advantageous embodiment.

With reference now to FIG. 6, an illustration of a cross-sectional view of tape 600 is depicted in accordance with an advantageous embodiment. In this example, tape 600 includes porous bonding layer 602, fiber layer 604, and porous bonding layer 606. Tape 600 is an example of tape 314 in FIG. 3 that may be produced using tape-production unit 302 in FIG. 3. Fiber layer 604, in these examples, is formed from spreading the fibers from a tow to form a spread-out tow, such as spread-out tow 318 in FIG. 3. The materials for fiber layer 604 may be for example, without limitation, carbon, fiberglass, boron, basalt, viscose (e.g. Rayon®), refractory oxides (alumina-based (e.g. Nextel®) or zirconia-based), silicon carbide, aramid (e.g. Kevlar® or Twaron®), polybenzoxazole (e.g. Zylon®), or any other suitable material.

In this example, porous bonding layer 602 may be formed using a material, such as, for example, without limitation, a melt-bondable thermoplastic, such as a porous thermoplastic material, polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyethertherketone, polyarylamide, polyketone, polyphthalamide, polyphenylenether, polybutylene terephthalate, polyethylene terephthalate, or any other suitable material. Of course, porous bonding layers 602 and 606 may be formed using any porous material that may bond with fiber layer 604.

In the different advantageous embodiments, porous thermoplastic materials, such as, for example, without limitation, veils of non-woven or woven thermoplastic fibers may be used. Of course, any material capable of bonding to fiber layer 604 may be used, in the different advantageous embodiments. These bonding layers may be porous layers, such that resins applied to tape 314 or a fabric manufactured from tape 314 in FIG. 3 may flow into and/or around fiber layer 604 during a curing process after the fabric from which tape 600 is made. Porous bonding layer 606 may be formed using the same type of material.

Tape 600 may be processed by applying heat pressure to these layers to bond porous bonding layer 602 and porous bonding layer 606 to fiber layer 604. In these examples, a melt-bonding process is used. The heat and pressure may be applied to tape 600 to compress fiber layer 604 to a desired thickness. Additionally, the bonding of porous bonding layer 602 and porous bonding layer 606 to fiber layer 604 may occur in a manner that prevents or reduces fibers within fiber layer 604 from expanding or "springing back" to a prior thickness present before the application of heat and pressure. In other words, the pressure and heat applied to form tape 600 may substantially maintain fibers in fiber layer 604 in a desired configuration. This desired configuration may be, for example, without limitation, fixing the fibers in places to eliminate or control gaps between adjacent fiber tows. The desired configuration also may be, for example, without limitation, maintaining a thinner thickness of the fiber as compared to the fiber prior to processing. Further, the fiber also may have a particular width from being spread out during processing that may be substantially maintained. The fiber layer may be spread out to create gaps of slits between adjacent fiber tows within a desired range prior to melt-bonding Tape 600 may have a thickness of around 0.30-millimeters thick. After applying heat and pressure, tape 600 may have a thickness of around 0.20-millimeters thick. This thickness is presented as one non-limiting example and other thicknesses may be used, depending on the implementation. For example, a unidirectional fabric may have an unconsolidated thickness of 0.25-0.30 mm prior to the application of heat and pressure instead of the 0.20-mm thickness that is desired. The porous bonding layers may each be between 10 and 100 microns prior to the application of heat and pressure, which will reduce their thickness by 50-90 percent. Only the porous bonding layers generally experience a change in thickness during this process as the structural fibers to which they are melt-bonded will typically not melt at the temperatures required to melt-bond the porous layers. Although two bonding layers are shown in these examples, a single bonding layer may be used instead of two, depending on the implementation.

Figure 7:
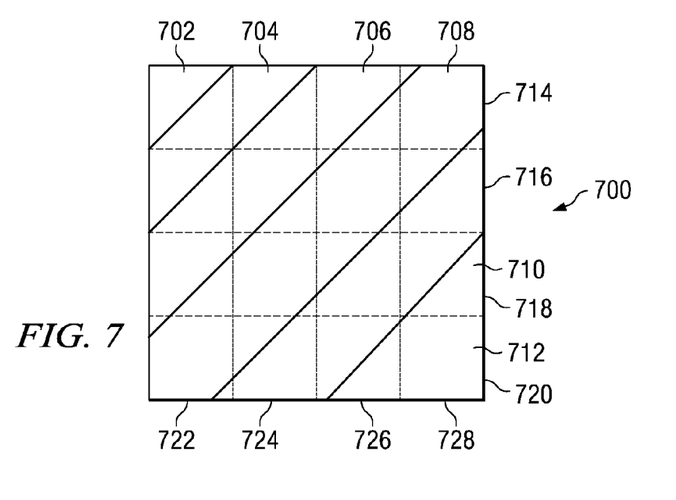
FIG. 7 is an illustration of fabric in accordance with an advantageous embodiment.

Turning now to FIG. 7, an illustration of fabric 700 is depicted in accordance with an advantageous embodiment. In this example, fabric 700 is an example of fabric 322, which may be used to manufacture composite part 324 in FIG. 3. In this example, fabric 700 is manufactured from tape, such as tape 314 in FIG. 3. Sections 702, 704, 706, 708, 710, and 712 are formed from strips of tape 314 that may be pulled and cut from tape 314. These sections may be in a different orientation from sections 714, 716, 718, and 720, which are sections shown by the dashed lines. In this example, yet another layer or ply is formed from sections 722, 724, 726 and 728, which are shown by dotted lines. These sections may be in another orientation with respect to the other sections.

In this example, the orientations of sections 702, 704, 706, 708, 710, and 712 may be around forty-five degrees from sections 714, 716, 718, and 720. In this example, section 722, 724, 726, and 728 are around ninety degrees from sections 714, 716, 718, and 720. In other advantageous embodiments, additional layers of tape may be placed onto the depicted layers for fabric 700. These layers may be at different orientations with respect to the presently depicted layers.

Three layers or plies of tape are shown in fabric 700, in this example. In other advantageous embodiments, other numbers of layers may be used. For example, two layers, five layers, and/or eight layers may be used for fabric 700. In these different examples, the different sections in the layer may be connected to each other. Further, the different layers illustrated also may be connected to each other. These different connections may be made using a tool, such as fabric production unit 304 in FIG. 3. In particular, as a non-limiting example, a knitting tool may be used to produce fabric 700.

Figure 8:
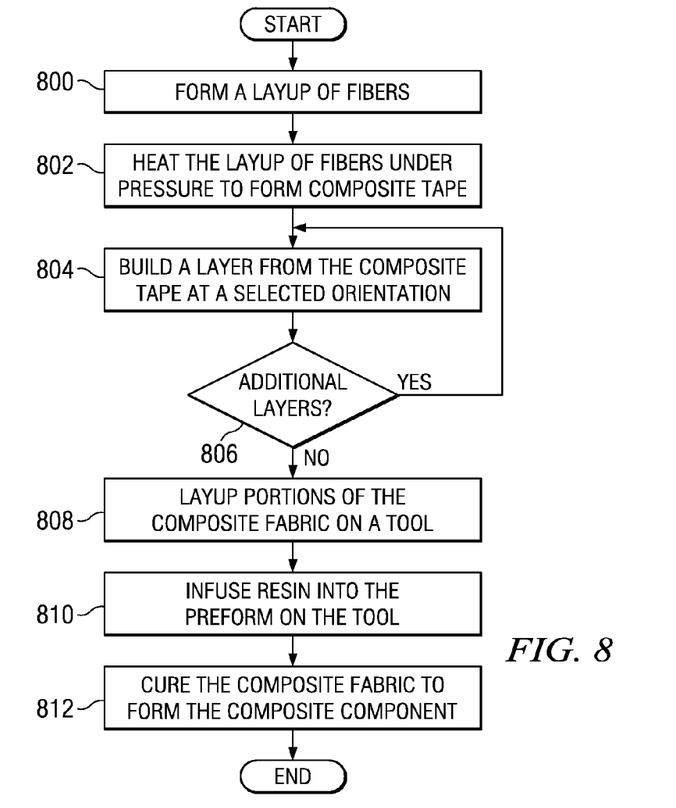
FIG. 8 is a flowchart of a process for manufacturing in accordance with an advantageous embodiment.

With reference now to FIG. 8, a flowchart of a process for manufacturing is depicted in accordance with an advantageous embodiment. The process illustrated in FIG. 8 may be implemented in a manufacturing system, such as manufacturing system 300 in FIG. 3.

The process begins by forming a layup of fibers (operation 800). The layup of fibers may include a fiber layer located between two porous bonding layers. In some embodiments, a single, porous bonding layer may be used. The layup of fiber may be heated under pressure to form a composite tape (operation 802). The pressure may be applied to compact or spread out the fibers to around a desired thickness. The heat may be applied to melt the porous bonding layer or cause the porous bonding layer to adhere to the fibers in the fiber layer. This bonding or attachment may be such that the fibers in the fiber layer remain in a compacted state that has a thickness of around the desired thickness.

The processing of this layup of fibers may be performed such that the porosity in the bonding layer may be maintained to allow for resins to enter and combine with fibers in the fiber layer during curing of this material when used in a fabric to form a composite component. This process layup of fiber forms the composite tape.

Thereafter, a layer may be built from the composite tape (operation 804). This layer forms one layer for a fabric. The layer in the fabric also may be referred to as a ply. The layer may be laid down at a selected orientation. This orientation may be different from other layers that may be used to form the fabric. For example, one layer may be placed at a zero-degree angle, while another layer is placed at a 45-degree angle. Yet another layer may be placed at a 90-degree angle and another layer may be placed at a minus –45-degree angle. These angles may be with respect to a selected reference in these examples. The reference may be with respect to the surface on which the fibers are being placed.

A determination is made as to whether additional layers are needed (operation 806). If additional layers are needed, the process returns to operation 804. This determination may be made based on how many layers have been placed or built up to form a layer or ply in the fabric as compared to the desired number of layers.

Once no more layers are needed for the fabric in step 806, the process may layup portions of the composite fabric on a tool (operation 808). This tool may be, for example, without limitation, a mold on which portions of the fabric are placed. This mold may have the shape of the composite component to be manufactured. The composite fabric does not yet contain resin to form finished part after infusion and curing. Resin may then be infused into the preform on the tool (operation 710).

After the portions of the composite fabric have been laid up on the tool, the composite fabric on the tool may be infused with resin and then cured to form the composite component (operation 812), with the process terminating thereafter. In these examples, the composite component may be cured using a low-pressure process in which the tool or mold may not need to be placed into an autoclave.

Thus, the different advantageous embodiments provide a method and apparatus for manufacturing. A fiber layer and a corresponding layer may be formed to form a layup of fibers. The layup of fibers may be heated under pressure to form a composite tape. A first layer may be built from the composite tape and a second layer may be built from the composite tape on the first layer at a predetermined angle from the first layer to form a composite fabric.

Portions of the composite fabric may be laid up in the tool in the form of the composite component. The composite fabric on the tool may be cured to form the composite component.

As a result, the different advantageous embodiments provide an ability to layup composite components in sizes that may not fit into many autoclaves. Additionally, purchasing larger and more-expensive autoclaves also may be unnecessary using the fabric manufactured under the different advantageous embodiments to produce composite components. The different advantageous embodiments provide a composite fabric that generally has a thickness of around the desired thickness for laying up composite components. As a result, pressure and heat needed to consolidate the fabric to a desired thickness is not necessary.

The description of the different advantageous embodiments have been presented for purposes of illustration and description, and is not intended to be exhaustive or limited to the embodiments in the form disclosed. Many modifications and variations will be apparent to those of ordinary skill in the art. For example, the different advantageous embodiments are described with respect to manufacturing composite components for aircraft. Some advantageous embodiments may be applied to producing composite components for other items. For example, without limitation, the composite fabric in the different embodiments may be used to produce composite components for spacecraft, submarines, cars, trucks, buildings, and ships. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing comprising:
    placing a unidirectional fiber layer on a porous bonding layer to form a unidirectional lay-up of fibers, the unidirectional lay-up of fibers comprising a first thickness;
    heating the unidirectional layup of fibers under pressure to fully melt the bonding layer so as to melt bond the bonding layer to the unidirectional fiber layer to form a unidirectional composite tape to substantially maintain the fibers in a desired configuration, the heating of the unidirectional layup of fibers under pressure also reducing the first thickness of the unidirectional layup of fibers in which the porous bonding layer is reduced between 50% to 90% in thickness;
    loading the unidirectional composite tape into a plurality of tape-lay-down units of a multiaxial fabric machine;
    pulling a first portion of the unidirectional composite tape from a first tape-lay-down unit and laying down the first portion onto a bed of the multiaxial fabric machine; and
    pulling a second portion of the unidirectional composite tape from a second tape-lay-down unit and laying down the second portion over the first portion to form a composite fabric, wherein the first portion and the second portion of the unidirectional composite tape are oriented at different angles;
    laying up at least a portion of the composite fabric on a tool;
    introducing resin into the composite fabric; and
    curing the composite fabric on the tool to form a composite component, wherein curing comprises applying heat to the composite fabric at about atmospheric pressure.

2. The method of claim 1, wherein the curing step comprises:
    curing the composite fabric in an oven.

3. The method of claim 1 further comprising:
    pulling and laying down a set of additional layers of the unidirectional composite tape on the first and second portions of unidirectional composite tape at a set of predetermined angles from the first and second portions to form the composite fabric.

4. The method of claim 1, wherein the porous bonding layer is a first porous bonding layer and wherein the unidirectional layup of fibers includes a second porous bonding layer and wherein the fiber layer is located between the first porous bonding layer and the second porous bonding layer.

5. The method of claim 1, wherein the unidirectional layup of fibers is compacted to a desired thickness.

6. The method of claim 1, wherein a position of the fibers is fixed within the unidirectional composite tape.

7. The method of claim 1, wherein the fiber layer is spread out to substantially eliminate gaps between adjacent fiber tows.

8. The method of claim 7, wherein spreading-out of the adjacent fiber tows are fixed.

9. The method of claim 1, wherein the unidirectional fiber layer is spread out to create gaps or slits between adjacent fiber tows within a desired range.

10. The method of claim 9, wherein the gaps between the adjacent fiber tows are fixed.

11. The method of claim 1, wherein the composite component is selected from one of a wing panel, a fuselage section, an aileron, a bulkhead, a stringer, a frame, a rib section, a tail section, a control surface, and a wing spar.

12. The method of claim 1, wherein the porous bonding layer is a thermoplastic bonding layer.

13. The method of claim 12, wherein the thermoplastic bonding layer comprises one of a nonwoven fabric and a woven fabric.

14. The method of claim 1 further comprising:
    slitting the unidirectional composite tape to a desired width to form a slit unidirectional composite tape; and
    loading the slit unidirectional composite tape into the multiaxial machine.

15. The method of claim 1, further comprising:
    knitting the first layer and the second portions together with a knit thread.

16. A method for manufacturing comprising:
    forming a fiber layer, a first porous bonding layer, and a second porous bonding layer, in which the fiber layer is located between the first porous bonding layer and the second porous bonding layer, into a unidirectional lay-up of fibers characterized by a first thickness;
    heating the unidirectional lay-up of fibers under pressure to fully melt the first porous bonding layer and the second porous bonding layer so as to melt bond the first porous bonding layer and the second porous bonding layer to the fiber layer to fix a position of fibers to form a unidirectional composite tape of desired thickness in which the fibers in the unidirectional composite tape are substantially maintained in a desired configuration, the heating of the unidirectional lay-up of fibers under pressure also reducing the thickness of the unidirectional layup of fibers to a desired thickness, the desired thickness reduced from the first thickness such that the first porous bonding layer and the second porous bonding layer reduce in thickness between 50% to 90%;
    slitting the unidirectional composite tape to a desired width to form a slit unidirectional composite tape;
    loading the slit unidirectional composite tape into a multiaxial fabric machine, wherein the loading includes loading the slit unidirectional composite tape into a plurality of tape-lay-down units;
    pulling a first portion of the slit unidirectional composite tape from a first tape-lay-down unit and laying down the first portion of the slit unidirectional composite tape onto a bed of the multiaxial fabric machine;
    pulling a second portion of the slit unidirectional composite tape from a second tape-lay-down unit and laying down the second portion of the slit unidirectional composite tape over the first portion of the slit unidirectional composite tape, wherein the first portion and the second portion of the slit unidirectional composite tape are oriented at different angles;
    pulling a third portion of the slit unidirectional composite tape from a third tape-lay-down unit and laying down the third portion of the slit unidirectional composite tape over the first portion and the second portion of the slit unidirectional composite tape, wherein the first portion, the second portion, and the third portion of the slit unidirectional composite tape are oriented at different angles, the first portion, the second portion, and the third portion of the slit unidirectional composite tape comprising a fabric; and
    consolidating the fabric to form a-consolidated fabric.

17. The method of claim 16 wherein the heating of the unidirectional lay-up of fibers under pressure causes the first porous bonding layer and the second porous bonding layer to melt on the fiber layer but not melt substantially into the fiber layer.

18. The method of claim 16 wherein the first porous bonding layer and the second porous bonding layer comprise a melt-bondable thermoplastic.

19. The method of claim 1 wherein the bonding layer comprises a veil of woven thermoplastic fibers.

20. The method of claim 16, wherein each of the plurality of tape-lay-down units comprises a spool, a moveable arm, and a tape head, the spool is configured to hold the slit unidirectional composite tape, the moveable arm is connected to the multiaxial fabric machine and is configured to move in a first direction relative to the multiaxial fabric machine, and the tape head is connected to the moveable arm and is configured to move in a second direction and a third direction relative to the multiaxial fabric machine and is also configured to rotate.

21. The method of claim 16 further comprising the steps of:
laying up portions of the consolidated fabric on a tool in a form of a composite component;
introducing resin into at least a portion of the consolidated fabric; and
curing the at least a portion of the consolidated fabric in the form of the composite component, wherein curing comprises applying heat at about atmospheric pressure.

* * * * *